United States Patent [19]

Thompson

[11] 4,060,013
[45] Nov. 29, 1977

[54] SKI-RENOVATING OR CONDITIONING TOOL

[75] Inventor: Arnold M. Thompson, Wheaton, Ill.

[73] Assignee: Gold Lode, Inc., Wheaton, Ill.

[21] Appl. No.: 695,128

[22] Filed: June 11, 1976

[51] Int. Cl.$^2$ .................... A63C 11/06; B27G 17/04
[52] U.S. Cl. ........................................ 76/83; 76/88; 280/11.37 T
[58] Field of Search .................. 280/11.37 T; 76/88, 76/83; 51/205 WG; 29/78, 80; 30/172; 15/236 R

[56] References Cited

U.S. PATENT DOCUMENTS

| | | | |
|---|---|---|---|
| 3,643,328 | 2/1972 | Wainwright | 280/11.37 T |
| 3,875,825 | 4/1975 | Buttafuoco | 280/11.37 T |

*Primary Examiner*—Harold D. Whitehead
*Assistant Examiner*—Roscoe V. Parker
*Attorney, Agent, or Firm*—Norman H. Gerlach

[57] ABSTRACT

A tool adapted for renovating or conditioning skis by sharpening the bottom and side surfaces thereof and including an elongated body having a pair of spaced apart shaving strips extending in parallelism along its underneath side and a pair of depending shaving blocks near its opposite ends, the blocks being spaced apart a distance slightly greater than the maximum width of any ski to be renovated by proper use of the tool. A handle is secured to and arches over the upper side of the body so that by first grasping the handle, they manipulate the tool so as to cause the shaving strips to bear transversely across the ski bottom in overhanging fashion and the shaving blocks to straddle the sides of the ski, then applying unidirectional torque to the body in either direction so as to bring the shaving blocks into contact with the usual metal insert-like runners at the juncture regions between the bottom and side surfaces of the ski, and finally moving the tool back and forth lengthwise of the ski, both the bottom and outer side surfaces of the ski runners are worked upon while, at the same time, the flat bottom working surface of the ski is scraped to a condition of flatness. In a preferred form of the tool, the depending shaving blocks are freely rotatable and have spaced apart shaving edges that automatically seat against the outer side surfaces of the metal ski runners of the ski being renovated so that during either the forward or reverse stroke of the tool the trailing shaving edges are properly maintained against gouging.

9 Claims, 10 Drawing Figures

U.S. Patent    Nov. 29, 1977    Sheet 1 of 2    4,060,013
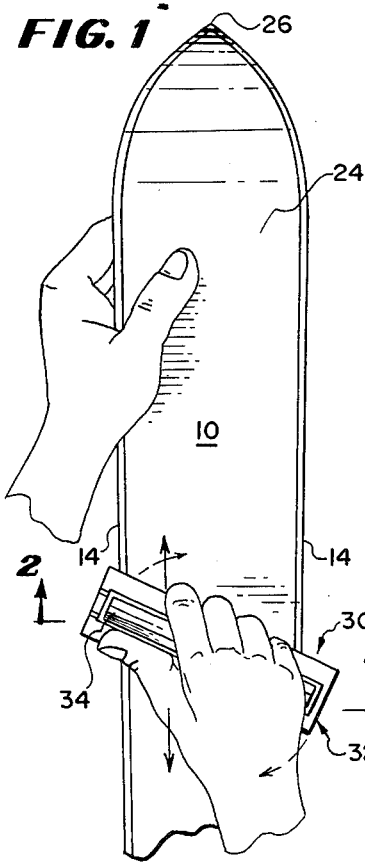
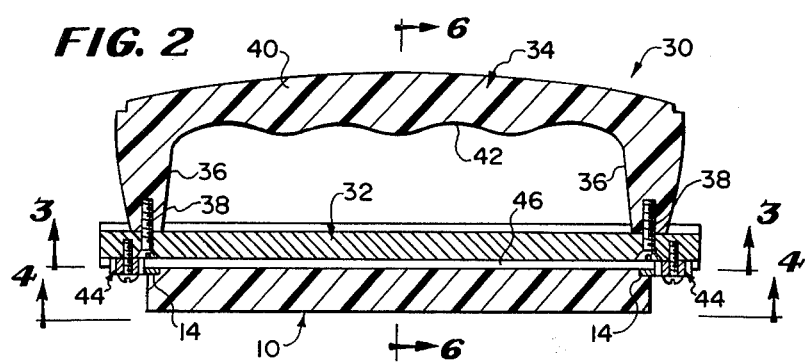
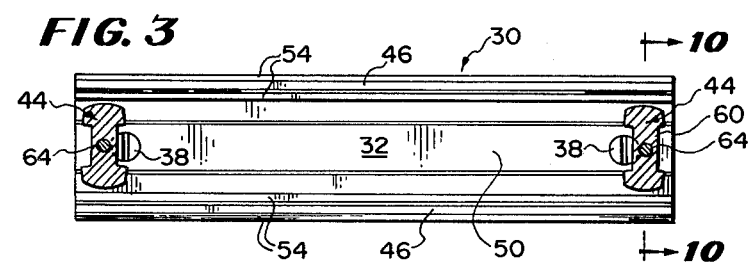
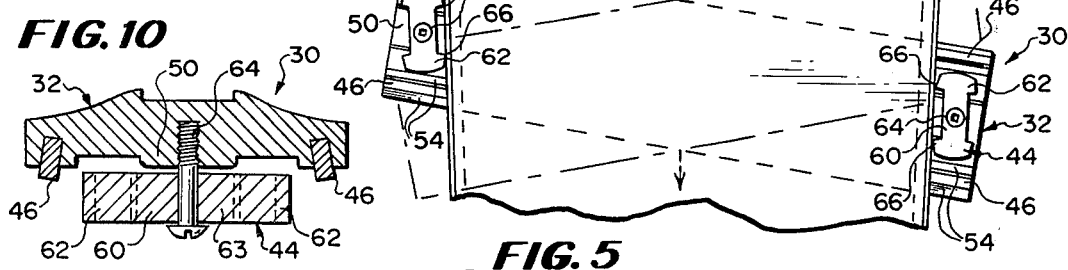
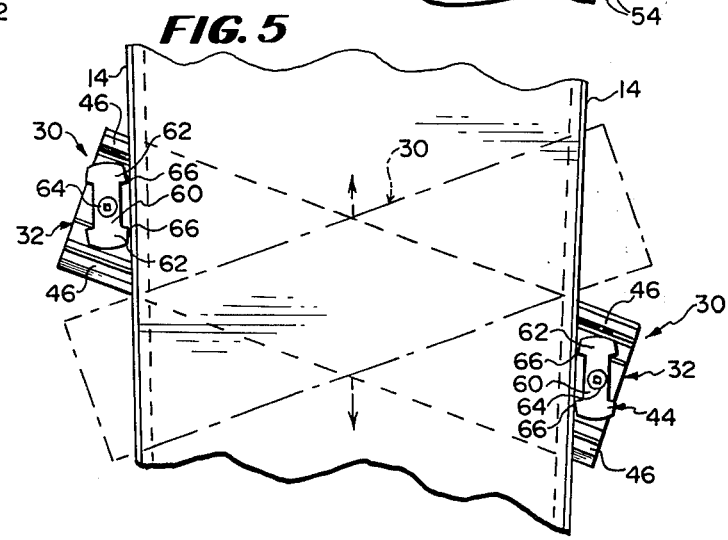

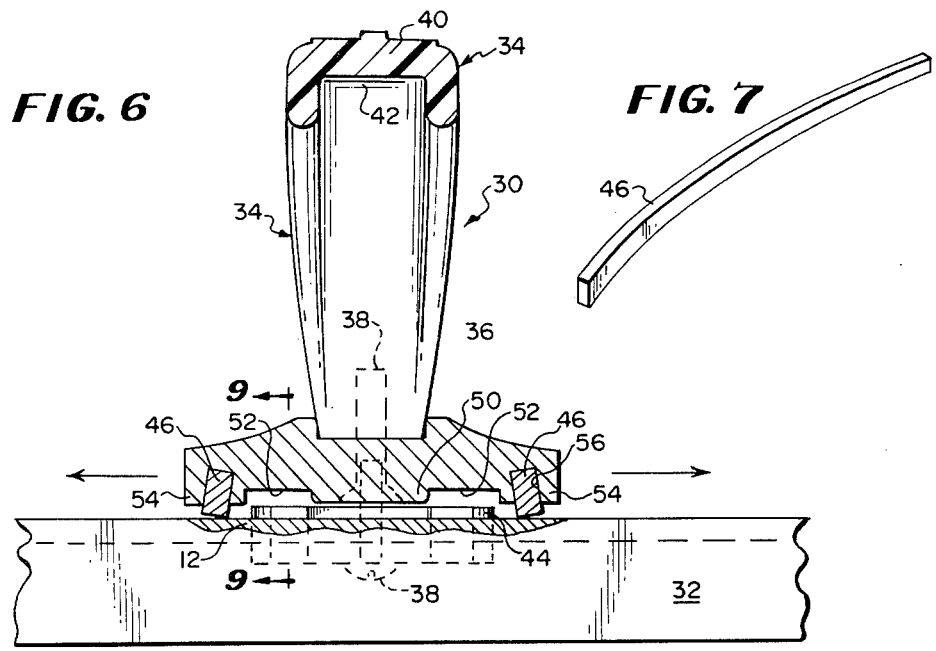
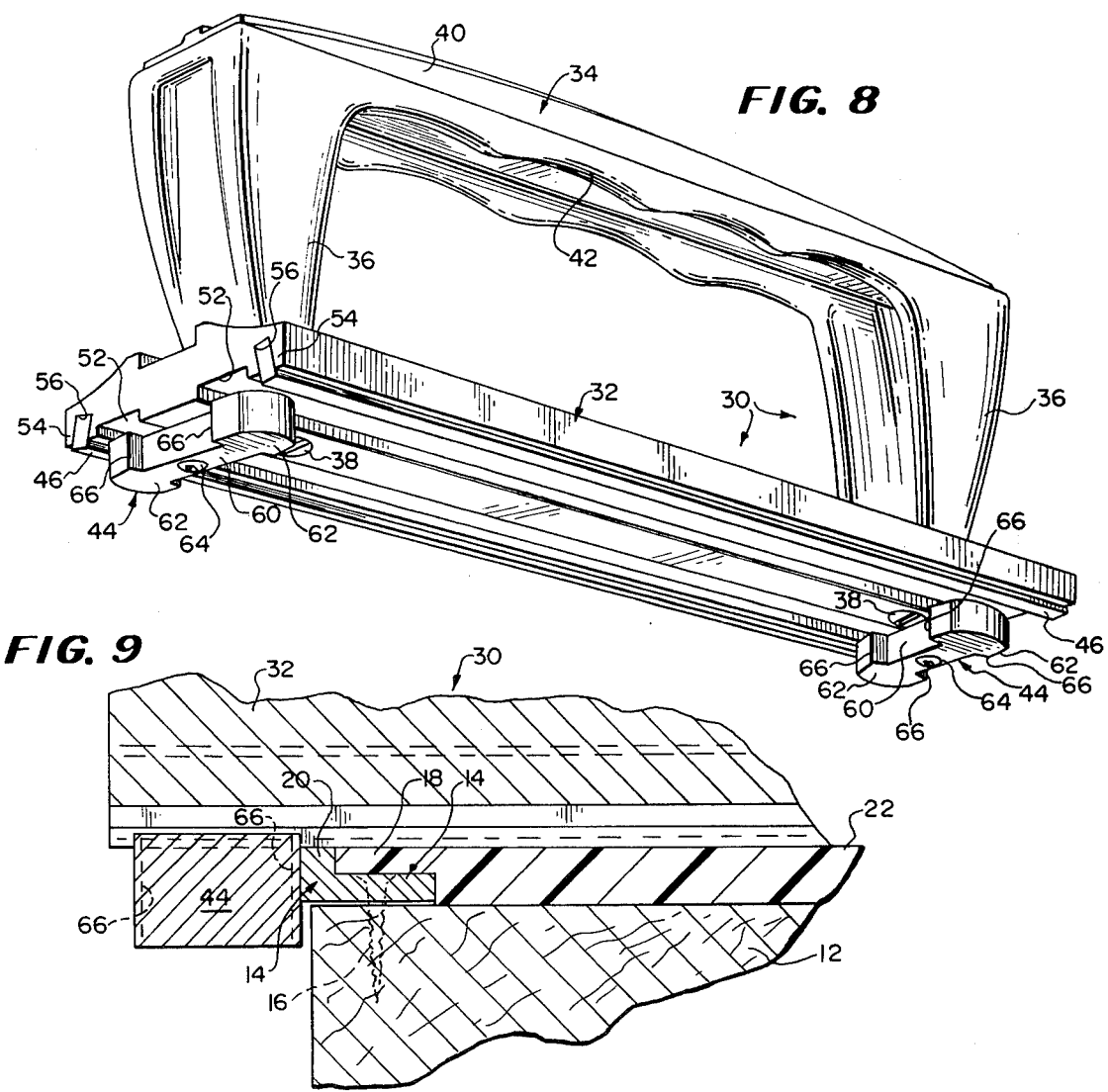

SKI-RENOVATING OR CONDITIONING TOOL

Skis, and particularly competitive skis, require constant maintenance in order to preserve or maintain an optimum degree of maneuverability as well as safety. A present-day ski of the particular type or character under consideration is constructed with metal strip-like inserts which are L-shaped in configuration, extend along the side edges of the bottom surface of the ski, and are arranged so that their vertical flange parts slightly overhang the longitudinally extending side surfaces of the ski and their horizontal flange parts extend inwards towards one another and abut against the side marginal regions of the bottom of the wooden ski body. The space between such metal L-shaped inserts (hereinafter referred to or termed "runners") is usually filled with a plastic material which, in the main, constitutes the exposed working or actual bottom surface of the ski as a whole. It is customary to apply a coating of wax to such bottom surface in order to reduce to a minimum the friction resulting from contact of the ski with snow or ice. Such an arrangement provides for greater speed and more accurate control by the ski user.

After repeated use of a ski of this general character, the metal insert-type runners become dented, as also does the ski bottom surface, and the latter also tends after a period of time to assume a concave contour in transverse or cross section. In the absence of special ski-conditioning tools complete replacement of the metal runners, as well as filling-in of the plastic concavity and levelling the same are often required, these operations being performed by skilled personnel and requiring use of various carpenters' tools, such as files, cutters, routers, planes, and the like. Such tools in the hands of experienced carpenters consume considerable time in connection with use, require special fixtures for holding in place the ski to be renovated or conditioned, and necessitate frequent changing from one type of tool to another. In the hands of an inexperienced operator, such tools could very well result in permanent damage or injury to the ski.

There are on the market at the present time and also there have been designed in the past, a number of ski-conditioning tools including files or cutters which may be slid along the side surface of the metal insert-type runners and find the necessary reaction support to effect a vertical cutting or filing operation, and also including scraper bars or strips which by a screed-type action ride on the exposed or bottom surfaces of the horizontal flange parts of the L-shaped metal runners and tend to level of the plastic repair material or the wax on the bottom surface of the ski, but without going into detail, such ski-conditioning tools have not proven altogether satisfactory, the principal limitation of them being the necessity of using great care and skill to prevent localized digging in the flies, cutters or scrapers bars or strips. Some of these tools take care of the exposed side surfaces of the overhanding vertical flange parts of the runners, while others take care of the working bottom surface of the ski. A few of them are intended to perform both functions simultaneously, but nevertheless all of them require special skills, necessitate fixtures for holding the ski stationary while operating the tools, or otherwise put the users thereof to great pains in properly using the tools. Finally, none of these known tools is designed to operate automatically with equal pressure on the opposite sides surfaces of the ski and to compensate for this limitation, provision has been made for either reversing the tool in use or reversing the positions of the cutters or scrapers.

The present invention is designed to overcome the abovenoted limitations that are attendant upon the construction and use of present-day ski-renovating or conditioning tools, and towards this end, the invention contemplates the provision of a novel tool which, insofar as conditioning the side surfaces of the L-shaped metal runners is concerned, employs two spaced apart shaving blocks which straddle the ski, and by exerting a "twisting" or torque action on the tool as a whole, are automatically brought into contact with the side surfaces of the ski with equal pressure. Moreover, each of these shaving blocks is floatingly or rotatably mounted on the tool body and, in addition, is formed with two shaving edges, one edge constituting a leading edge and the other edge constituting a trailing edge, depending upon the direction of motion of the tool as it is slid back and forth along the ski, so that the leading edge constitutes a stabilizing-type support for the trailing edge during each stroke of the tool, thereby insuring that the edge which actually performs the shaving operation will not, and cannot, dig into the outer side surface of the adjacent L-shaped metal runner regardless of the degree of pressure which is applied thereto.

With respect to conditioning of the bottom surface of the ski, that is, both the bottom surfaces of the horizontal flange parts of the L-shaped metal runners and the bottom surface of the wax or plastic expanse of material between the runners, there obtains substantially the same supporting condition for two elongated, parallel, spaced apart, longitudinally extending shaving strips which are mounted on the underneath side of the tool body and are adapted to be employed in screed-like fashion. As the improved tool is moved back and forth along the ski depth of be renovated or conditioned, the trailing shaving strip performs the actual shaving or scraping action while the leading shaving strip lends support to the trailing strip so that the latter does not have a tendency to dig into the bottom surface of the ski.

The provision of a ski-conditioning tool such as has briefly been outlined above and possessing the stated advantages, constitutes the principal object of the present invention. In carrying out this object, the aforementioned elongated screed-like shaving strips are mounted in spaced apart, longitudinally extending grooves in the underside of the tool body while the floating or rotatable shaving blocks are disposed adjacent to the end regions of such shaving strips, are spaced apart from each other a distance somewhat greater than the width of the ski, and depend from the bottom of the tool body a distance at least as great as the height of the vertical flange parts of the L-shaped metal runners. Thus, when the underneath side of the tool is pressed against the bottom surface of the ski so that the elongated shaving strips rest upon the outer surfaces of the horizontal flange parts of the runners in screed-like fashion, the depending shaving blocks straddle the side of the ski. An arch-like handle is provided on the tool body and is adapted to be grasped by one hand of the tool user or operator for the application of unidirectional torque to the tool, while the other hand of the user or operator may be used to steady or hold the ski during the conditioning operation as the tool is moved back and forth along the ski for renovating or conditioning purposes.

The provision of a ski-renovating or conditioning tool which is relatively simple in its construction and, therefore, may be manufactured at a low cost; one which is comprised of a minimum number of parts, particularly moving parts and which is, therefore, unlikely to get out of order; one which is rugged and durable and, therefore, will withstand rough usage; one wherein each of the two floating or rotatably mounted shaving blocks is formed with four shaving edges and are reversible on the tool body so that a selected pair of shaving edges may be rendered effective for conditioning purposes, thereby prolonging the useful life of shaving blocks; one in which the elongated shaving strips are similarly reversible for the same purpose; one in which the various tool elements are capable of ease of assembly and dismantlement for purposes of inspection, replacement, or repair of the component parts thereof; one which is pleasing in its appearance and attractive in its design; and one which is otherwise well-adapted to perform the services required of it, are further desirable features which have been borne in mind in the production and development of the particular tool constituting the present invention.

Other objects and advantages of the present invention will be readily apparent from a consideration of the following detailed description.

The invention consists in the several novel features which are hereinafter described and are more particularly defined by the claims at the conclusion hereof.

In the accompanying two sheets of drawings forming a part of this specification, two illustrative embodiments of the invention are shown.

In these drawings:

FIG. 1 is a fragmentary top plan view of the front or toe end region of a ski which is undergoing renovating or conditioning by way of tool embodying the present invention;

FIG. 2 is an enlarged vertical sectional view taken on the line 2—2 of FIG. 1;

FIG. 3 is a horizontal sectional view taken on the line 3—3 of FIG. 2;

FIG. 4 is a bottom plan view of the structure which is shown in FIG. 3, the view being taken in the direction of the arrows at the ends of the line 4—4 of FIG. 3;

FIG. 5 is a bottom plan view similar to FIG. 4 but showing the ski-renovating or conditioning tool effectively applied to the ski in the narrow medial region of the latter;

FIG. 6 is an enlarged vertical sectional view taken on the line 6—6 of FIG. 2;

FIG. 7 is a perspective view of one of the two shaving strips which are employed in connection with the invention, the strip being shown in its free state;

FIG. 8 is an enlarged underneath and side perspective view of the preferred form of the improved ski-renovating or conditioning tool;

FIG. 9 is an enlarged vertical sectional view taken on the line 9—9 of FIG. 6; and FIG. 10 is an enlarged vertical sectional view taken on the line 10—10 of FIG. 3.

Referring now to the drawings in detail, FIGS. 1, 3, 4, 5, 6, and 9 show the general construction of a conventional ski which is designated in its entirety by the reference numeral 10 but which is only fragmentarily shown in each of these individual views. The body 12 of the ski is ordinarily formed of wood and the upper or top surface thereof is usually planar or nearly so and carries on its medial region the usual boot-securing harness of clamp-type equipment (not shown). Along the lower side corner portions of the ski body 12 is a pair of insert-type runners 14 and these are fixedly secured in place by screws 16, the runners 14 being substantially coextensive with the sides of the ski. Each runner 14 is L-shape in cross section and includes a horizontal flange part 18 which abuts against the adjacent side marginal region of the bottom surface of the ski body 12, and a vertical flange part 20 which extends downwards from the outer side marginal region of the horizontal flange part 18. The screws 16 pass through holes in the horizontal flange parts 18 of the runners 14 at spaced regions therealong and maintain the runners 14 in such position of the bottom side of the ski body 12 that the outer surfaces of the vertical flange parts 20 overhang the side surfaces of the body 12 as best shown in FIG. 8 in order that the runners 14 will afford a biting action in the snow when the ski is in use.

The bottom of a modern or present-day ski is usually made of a high quality plastic material and thus is bordered on its sides by the metal runners 14. Accordingly, a relatively thick layer of such plastic material 22 is bonded or otherwise secured to the bottom surface of the wooden ski body 12 and it extends between the vertical flange parts 20 of the runners 14 and is arranged so that its side marginal portions underlie the horizontal flange parts 18 of said runners. The bottom faces of the vertical flange parts 20 of the runners 14 and the underneath or bottom face of the plastic layer 22 are flush and normally present a uniform flat or planar ski bottom surface except, of course, for the usual shovel curvature of the ski at its front end. This generally planar bottom surface of the ski 10 is ordinarily waxed frequently by the ski owner in order to keep the ski in good condition and produce a minimum frictional retardation of ski movement along the ski path.

Although the complete outline of the ski body 12 is not disclosed herein in any single view of the drawings, it will be understood that the forward shovel portion 24 (see FIG. 1) immediately rearwardly of the ski tip 26 is relatively wide in the transverse direction of the ski and also that the body gradually becomes slightly narrower in the medial region and then widens out slightly in the tail or rear end region, the body terminating in a linearly straight rear edge. The arrangement of the ski 10 thus far described is purely conventional and no claim is made herein to any novelty in it, the novelty of the present invention residing rather in the provision of an improved ski-renovating or conditioning tool the preferred embodiment of which is shown in detail in FIG. 8, and the nature of which will now be fully set forth and subsequently claimed.

Referring now particularly to FIGS. 6, 8, and 9 of the drawings, the tool of the present invention is designated in its entirety by the reference numeral 30 and it involves in its general organization an elongated, generally rectangular body 32 which is preferably formed of a suitable lightweight metal, such, for example, as aluminum, and the upper side of which carries a manipulating handle 34 of arched or inverted U-shape design. The depending side legs 36 of the handle are fixedly anchored to the end regions of the body 32 by means of screws 38, and the medial or bight portion 40 of the handle 34 is formed with an undulatory underneath surface 42 for finger comfort incident to grasping of the handle by the tool user.

The underneath side of the tool body 32 carries two sets of ski-treating devices, one set consisting of a pair of floating or pivoted shaving blocks 44, and the other set consisting of a pair of elongated fixed shaving strips 46 (see FIGS. 2, 3, 6, 7, and 8). The shaving blocks 44 are designed for treating the outer surfaces of the vertical flanges 20 of the L-shaped metal runners 14 of the ski 10, while the shaving strips 46 are designed for treating the entire bottom surface of the ski 10, all in a manner and for purposes that will be made clear presently.

Still referring to FIGS. 6, 8, and 9 of the drawings, the underneath side of the tool body 32 is formed with a centrally disposed, longitudinally extending rib 50 alongside which there extends a pair of longitudinal recesses 52. A pair of depending longitudinal ribs 54 extends along the side portions of the body 32 and each of these ribs has formed therein a relatively deep, coextensive, strip-confining groove 56 and extends upwards and inwards at a slight angle with respect to the vertical for purposes that will be made clear presently. Disposed within each groove 56 and frictionally yet securely held therein is one of the aforementioned elongated shaving strips 46. As shown in FIG. 7, each shaving strip 46 is originally fashioned on a slightly curved bias and is rectangular in cross section so as to present four elongated right-angle shaving edges, the particular edge which is effective at any given time being the lowermost edge and dependent upon the manner in which the strip is inserted in its respective groove 56. By inverting the shaving strips 46 within their respective grooves 56 or by turning the strips in end-to-end fashion different shaving edges may be made effective as will become clear subsequently when the operation of the ski-renovating or conditioning tool 30 is set forth. Each shaving strip 46 is coextensive with its respective groove 56. As also will become apparent subsequently, the two shaving strips 46 are designed to bridge the vertical flange part 20 of the L-shaped metal runner 14 of the ski 10 in screed-like fashion during the conditioning operation as best shown in FIGS. 1, 2, and 4, the end regions of said shaving strips exerting a shaving or conditioning action on the bottom surfaces of the vertical flange parts 20 of the runners 14 while the medial regions of the strips 46 exert a shaving action on the wax which has been applied to the plastic layer 22 and thereby effect excess wax removal.

Considering now the nature and function of the floating or pivoted shaving blocks 44, and with particular reference to FIGS. 8 and 10 of the drawings, such blocks are pivotally secured to the central longitudinal rib 50 at points adjacent to the opposite ends of the rib, and since such blocks are especially designed to effect shaving of the outer side surfaces of the vertical flange parts 20 of the runners 14 of the ski 10, they are spaced apart a distance somewhat greater than the maximum width of the ski 10, i.e., the width in the shovel portion 24. The two shaving blocks 44 are designed for simultaneous shaving cooperation with the outer side surfaces of the L-shaped metal runners 14 on opposite sides of the ski 10, and this simultaneous cooperation is attained as will be described in greater detail presently when the conditioning tool 30 is applied to the bottom side of the ski in the manner in which it is illustrated in FIG. 1, the user utilizing one hand to grasp the handle 14 and exert a twisting or torque action, so to speak, on the tool as a whole.

As best seen in FIGS. 8 and 10 of the drawings, each shaving block 44 is, generally speaking, of I-shaped configuration. It is preferably in the form of a hardened steel member and consists of a central bridge portion 60 and widened end portions 62. The central bridge portion 60 of each block 44 is centered upon a vertically extending sleeve 63 which loosely surrounds a vertically extending shouldered bolt 64, the upper end of which is threadedly received in an internally threaded hole in the central depending rib 50 on the underside of the tool body 32. The shaving blocks 44 are thus capable of 360° rotational movement about the axes of their respective mounting bolts 64. The widened end portions 62 of each shaving block 44 are provided with side faces which converge slightly outwards away from the bridge portion 60 and thus define along their marginal portions four sharp shaving edges 66, two of which are designed for direct edge-to-face contact with the outer surface of the vertical flange part of the adjacent runner 14 during operation of the tool, as will be described subsequently. The particular two shaving edges 66 which thus engage the outer surface of the vertical flange part of the adjacent runner will, of course, depend upon the rotational orientation or position assumed by the shaving block at the time it is initially brought into engagement with the runner.

In the operation of the herein described ski-renovating or conditioning tool 30 of the present invention, the underneath side of the tool 30 is applied to the bottom surface of the ski 10 as shown in FIG. 1 with the two shaving blocks 44 straddling the opposite sides of the ski and with the elongated fixed shaving strips 46 bridging the distance between the L-shaped metal runners 14 and resting thereon in screed-like fashion. It is not necessary that the ski to be renovated or conditioned be fixedly clamped in a vise or other fixture, one convenient mode of holding the ski against the reaction force of the tool 30 being to lean the ski against a wall or the like and to hold the shovel portion 24 of the ski between the fingers of the left hand as shown in this view, while using the right hand to apply the tool to the ski. The underneath side of the tool 30 is pressed against the bottom surface of the ski manually and the tool is then twisted, so to speak, by applying torque to the handle 34 in either a clockwise or a counterclockwise direction. Ordinarily, a right-handed person will apply clockwise torque to the tool as indicated by the curved arrows in FIG. 1 of the drawings, and when such torque is applied, the two shaving blocks 44 will engage the outer surfaces of the overhanging vertical flange parts of the L-shaped metal runners 14 as shown in FIGS. 4 and 5. No particular care need be taken to insure proper seating of the shaving blocks 44 against the runners inasmuch as such blocks are pivoted for 360° rotation, and thus, they will naturally fall into their proper and desired seating engagement on the outer surfaces of the vertical flange parts of the runners, it mattering not which sides of the blocks contact the runners.

After the above steps have been taken and while maintaining such clockwise torque upon the tool and also maintaining forward pressure of the tool against the bottom surface of the ski, the tool will be shifted bodily back and forth along the ski. During either the "up" stroke or the "down" stroke of the tool, the contacting trailing shaving edges 66 of the blocks 44 will effect the desired shaving action of the outer surfaces of the vertical flange parts of the runners 14 and there will be no danger of gouging of said outer surfaces because both shaving blocks 44 are individually stabilized due to their two spaced apart areas of contact with runners. The contacting leading shaving edge 66 of each block will merely slide along the adjacent runner, while the contacting trailing shaving edge 66 which is set at a cutting angle will effect or cause the desired shaving action.

It will be understood, of course, that in the case of a left-handed user or operator, he or she will be most likely to hold the shovel portion 24 of the ski 10 with the right hand and manipulate the tool with the left hand, applying counterclockwise torque to the tool instead of clockwise torque as in the case of a right-handed user or operator. The net result will, of course, be the same so far as ski-renovating or conditioning is concerned.

During the back and forth movement of the tool 30 as described above, shaving of the outer surfaces of the vertical flange parts 20 of the L-shaped metal runners 14 is accompanied by simultaneous conditioning of the entire bottom surface of the ski including both the horizontal bottom surfaces of the flange parts 20 (see FIG. 9) of the runners and the outer surface of the broad expanse of the plastic layer 22 which is disposed between the two runners 14. It is to be noted at this point that insofar as conditioning of the bottom face of the runners 14 is concerned, during either the "up" or forward stroke of the tool 30, or during the "down" or rearward stroke, the operative leading shaving edge of the trailing shaving strip 46 will effect the desired shaving or conditioning action on the bottom surface of the ski while the operative trailing shaving edge of the leading shaving strip 46 will merely ride on the bottom surfaces of the vertical flange parts of the runners 14 and stabilize the tool so that there will be no tendency for the operative shaving edge of the trailing shaving strip to dig into or gouge the metal of the runners. It will also be noted that since the tool is shifted along the ski at an angle, a more effective shaving action will take place than when the operative shaving edge moves back and forth while at true right angles to the ski.

Inasmuch as the length of the tool 30 is greater than the width of the ski 10 and inasmuch as the two shaving blocks 44 are set apart a distance somewhat wider than the maximum width of the ski and depend from the underneath side of the tool a distance greater than the height of the vertical flange parts of the L-shaped metal runners 14, it will be apparent from the above description that as the tool 30 is moved back and forth longitudinally along the ski bottom, the two elongated shaving strips 46 will operate upon the coplanar faces of the runners and also upon the bottom surface of the plastic layer 22 in such manner as to remove excess wax or otherwise bring the bottom surface of the ski to a planar condition, while at the same time, due to the torque which is applied to the tool body 32, the shaving blocks 44 will operate upon the outer side surfaces of the vertical flange parts of the runners 14 in the manner previously described. An important feature of the invention resides in the fact that due to such application of torque to the tool, the shaving blocks will adjust themselves to the sides of the runners, the blocks automatically moving inwardly toward each other as the narrower portions of the ski are reached and automatically moving outwardly away from each other as the wider portions of the ski are encountered. Ordinarily, it is not customary to condition the shovel portion 24 (see FIG. 1) of the ski or that portion of the ski which lies forwardly of such shovel portion.

Apart from the specific use of the tool 30, various skis are treated differently during the conditioning thereof. For example, during use of a particular ski, the bottom and side surfaces of the ski may acquire certain void-like defects in the form of nicks, gouges or cuts. These defects may be remedied by filling them with a hot-melt plastic or other filler material and then utilizing a trowel-like blade in order to remove high spots. Levelling of the excess filler material in this manner is not an exact operation and occasionally high spots are left on the bottom surface of the ski, it being understood, of course, that subsequent use of the present ski-renovating or conditioning tool 10 in the manner previously described will quickly and readily remove all such remaining excess high spots. The same applies to the application of wax to the ski bottom, the two elongated shaving strips 46 serving to level off or remove any excess wax at the same time that the coplanar bottom surfaces of the vertical flange parts 20 of the runners 14 are conditioned by the shaving blocks 44. Such levelling of the ski bottom between the two runners takes place due to the screed action which occurs with the two runners functioning as screed surfaces.

What has been set forth above in connection with the correction or treatment of gouges, nicks, and the like is equally applicable to the complete refinishing of a ski bottom surface which, after long or repeated continued use, tends to become concave. In such an instance, fresh hot-melt plastic may be applied to the concavity in a ski bottom surface in order to bring it to a substantially planar condition and, thereafter, use of the present tool 10 in the manner described will restore said bottom surface of the ski to a truly planar or useable condition.

Finally, it is to be noted that because single-handed torque is applied to the tool from the central region of the arched handle 34, no unequal or intensive pressure will be applied to the side surfaces of the runners 14 as is the case with similar ski-conditioning tools employing outside runner-like cutters, files, or scapers and wherein the torque which is applied to the tool is effected by utilizing overhanging handles at opposite ends of the tool, there being one handle for each of the operator's hands. A tool of this general character is shown and described in U.S. Pat. No. 3,643,328, granted on Feb. 22, 1972, and entitled "SKI-RENOVATING TOOL." With such a tool, individual pressure is applied to the sides of the ski runners by each hand and however careful an operator may be in attempting to effect equalized pressure on the runners, the natural tendency for a right-handed operator is to use more pressure with his right hand than with his left. Furthermore, with both hands thus occupied, it is necessary that the ski be securely fastened against movement in a vice or other holder. Such a tool, therefore, is not readily adaptable to use in the field and ordinarily it is a shop tool.

The invention is not to be limited to the exact arrangement of parts shown in the accompanying drawings or described in this specification as various changes in the details of construction may be resorted to without departing from the spirit or scope of the invention. Therefore, only insofar as the invention is particularly pointed out in the accompanying claims is the same to be limited.

Having thus described the invention what I claim as new and desire to secure by letters patent is:

1. A ski-renovating or conditioning tool comprising a generally rectangular body having a torque-applying handle thereon, said body being of sufficient length as to straddle and overhang the bottom surface of a ski, a pair of non-circular shaving members depending from the overhanging end regions of the body, pivotally connected to said overhanging end regions for swinging movement about vertical axes, and adapted to condition the side surfaces of the ski when the tool body is manually reciprocated along said bottom surface in screed-like fashion with unidirectional torque being applied thereto by means of the handle, the effective distance between said shaving members being fixed and appreciably greater than the maximum width of the bottom surface of the ski whereby such application of unidirectional torque to the body will cause said shaving members to follow the contour of said side surfaces with substantially equal pressure during reciprocation of the body in either direction, said shaving members being shaped so as to present spaced apart shaving edges which automatically adjust themselves to the side surfaces of the ski under the influence of the application of unidirectional torque to the tool body.

2. A ski-renovating or conditioning tool as set forth in claim 1 and wherein the shaving edges on each shaving member are at least two in number, extend vertically, are spaced apart in a fore and aft direction, and so arranged that the trailing shaving edge will exert a shaving action against the adjacent ski side surface while the leading shaving edge will, by a sliding action, stabilize said trailing edge.

3. A ski-renovating or conditioning tool as set forth in claim 1 and wherein each shaving member is centrally pivoted to the body for 360° rotation about its pivotal axis and is in the form of a block having on opposite sides thereof a pair of spaced apart shaving edges which automatically adjust themselves to the adjacent side surface of the ski under the influence of the application of unidirectional torque to said body.

4. A ski-renovating or conditioning tool as set forth in claim 3 and wherein each pair of shaving edges is so arranged that the trailing shaving edge will exert a shaving action on the adjacent ski side surface while the leading shaving edge will, by a sliding action, stabilize said trailing edge.

5. 2. ski-renovating or conditioning tool as set forth in claim 4 and wherein each block is of I-shaped configuration and is pivoted to the tool body by means of a shouldered bolt in order that it is removable limbs. replacement purposes.

6. A ski-renovating or conditioning tool as set forth in claim 1 and wherein there is a pair of longitudinally spaced elongated shaving strips mounted on the underneath side of the tool body, each shaving strip is rectangular in cross section and is received coextensively in a groove in the underneath side of the tool body, each corner edge of each strip constitutes in effect a sharp shaving edge, and each strip in its free state is formed on a relatively long radius of curvature whereby insertion thereof into its respective groove will maintain the same frictionally and removably within the groove for shaving edge interchange purposes.

7. A ski-renovating or conditioning tool as set forth in claim 6 and wherein the two grooves in the underneath side of the body slant downwardly and outwardly away from each other at a slight angle whereby the effective shaving edge on the trailing shaving strip will exert a shaving action on the ski bottom surface while the effective shaving edge on the leading shaving strip will stabilize said effective shaving edge on said trailing shaving strip.

8. A ski-renovating or conditioning tool as set forth in claim 1 and wherein a pair of longitudinally spaced elongated shaving strips are mounted on the underneath side of the tool body and substantially span the distance between the shaving members, said strips constitute in effect screed elements proper and have extending coextensively therewith shaving edges which are designed for shaving cooperation with the bottom surface of the ski, and each shaving member is centrally pivoted to the tool body for 360° rotation about its pivotal axis and is in the form of a block having on opposite sides thereof a pair of spaced apart shaving edges which automatically adjust themselves to the ski side surfaces under the influence of the application of unidirectional torque to said tool body.

9. A ski-renovating or conditioning tool as set forth in claim 8 and wherein each block comprises a reduced central bridge portion and widened and enlarged end portions and its shaving edges are formed by the inner corners of said widened and enlarged end portions.

* * * * *